United States Patent [19]

Sakamoto

[11] 4,404,605

[45] Sep. 13, 1983

[54] HEAD TRACKING CONTROL SYSTEM

[75] Inventor: Hitoshi Sakamoto, Zama, Japan

[73] Assignee: Sony Corporation, Tokyo, Japan

[21] Appl. No.: 259,959

[22] Filed: May 4, 1981

[30] Foreign Application Priority Data

May 8, 1980 [JP] Japan .................................. 55-60924

[51] Int. Cl.³ ........................ G11B 5/52; G11B 21/10; G11B 21/18
[52] U.S. Cl. ........................................ 360/77; 360/70; 360/107; 360/109
[58] Field of Search ............................. 360/77, 75–76, 360/78, 70, 105, 109, 113, 10.1–10.3, 11; 313/331, 316

[56] References Cited

U.S. PATENT DOCUMENTS

| | | | |
|---|---|---|---|
| 2,855,464 | 10/1958 | Wiegand | 360/111 |
| 2,870,267 | 1/1959 | Duinker et al. | 360/111 |
| 4,163,994 | 8/1979 | Sakamoto et al. | 360/77 X |
| 4,172,265 | 10/1979 | Sakamoto et al. | 360/70 |
| 4,223,358 | 9/1980 | Kubota et al. | 360/75 |
| 4,251,838 | 2/1981 | Saito | 360/77 |

Primary Examiner—John H. Wolff
Attorney, Agent, or Firm—Lewis H. Eslinger; Alvin Sinderbrand

[57] ABSTRACT

A video tape recording/reproducing apparatus for reproducing video signals recorded in successive parallel tracks on a magnetic tape includes a magnetic head for scanning the tracks to reproduce the signals recorded therein; a bi-morph leaf for deflecting the head in a direction transverse to the direction along the tracks; a controllable oscillator for supplying a wobbling signal to the bi-morph leaf so as to cause the latter to deflect the head to oscillate in a transverse direction with respect to the tracks, whereby the signals reproduced by the head are amplitude modulated at the frequency of the wobbling signal; a tracking error detecting loop for supplying a tracking error signal, corresponding to deviation of the head from the respective track being scanned, to the bi-morph leaf so as to control the latter to correct the deviation; and a signal detecting loop for detecting the fundamental and second harmonic components of the amplitude modulated signals reproduced by the head and for controlling the amplitude of the wobbling signal from the controllable oscillator in response to a ratio of the levels of the second and fundamental harmonic components so as to reduce the amplitude of the wobbling signal for small tracking errors and to increase the amplitude of the wobbling signal for large tracking errors.

17 Claims, 19 Drawing Figures

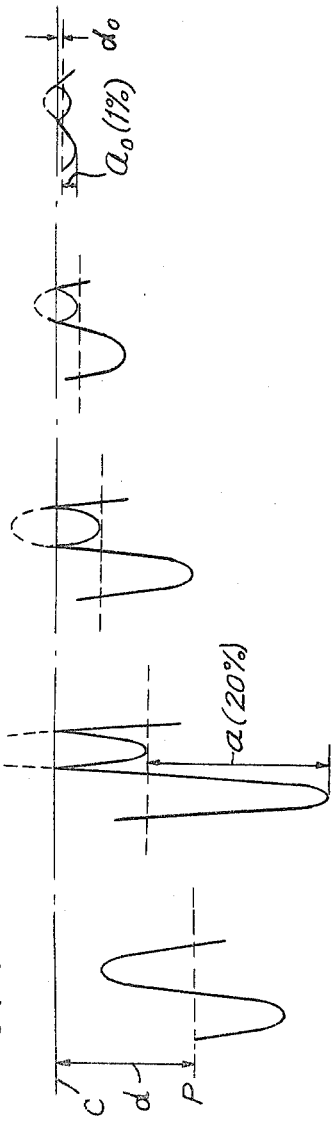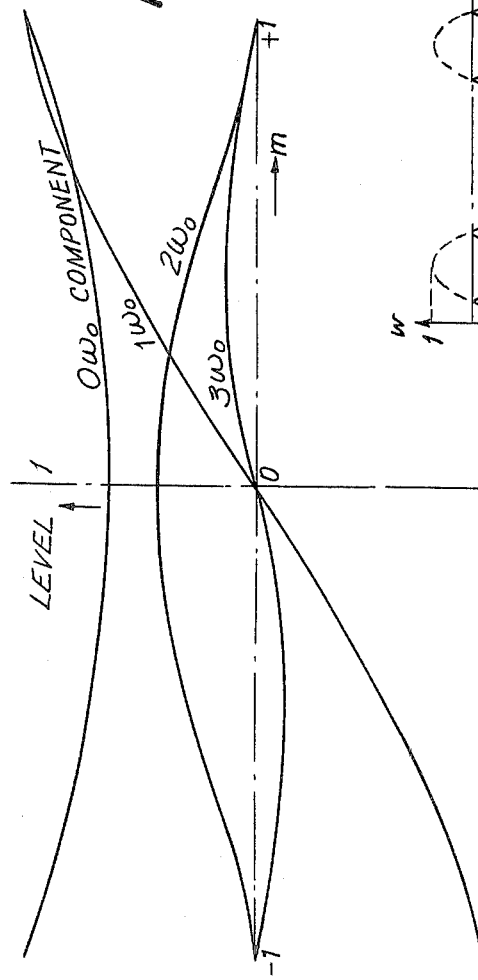

HEAD TRACKING CONTROL SYSTEM

BACKGROUND OF THE INVENTION

1. Field of the Invention

This invention relates generally to apparatus, such as a video tape recorder (VTR) of the so-called "helical-scan type," in which video or other information signals are recorded in successive parallel tracks which are skewed or extend obliquely on a magnetic tape and, more particularly, is directed to an improved tracking control system by which a magnetic head or other transducer in such apparatus is made to accurately scan the track or tracks in which the video or other information signals are recorded.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and a transducer or magnetic head is mounted on a rotated portion of the guide drum so as to rotate with the latter and thereby repeatedly scan across the tape in a path at an angle to the longitudinal direction of the tape. During the recording operation of the VTR, the angle between the scanning path, and hence each record track, and the longitudinal direction of the tape is dependent on the rotational speed of the rotary head and also the speed at which the magnetic tape is longitudinally advanced. Accordingly, if the speed and direction of advancement of the magnetic tape are not the same during the reproducing operation as during the recording operation, then the scanning path of the magnetic head during reproducing will not precisely follow or coincide with a record track on the tape during each movement of the head across the tape and, accordingly, the recorded video or other information signals may not be completely or accurately reproduced.

Various tracking control or servo systems have been proposed for maintaining correct tracking or scanning of the record tracks by the rotary head. In one such system, means, such as a bi-morph leaf, is provided for deflecting the head in a direction normal to the plane of its rotation, that is, in a direction which is transverse in respect to the direction along each of the record tracks, and the amount of such deflection is electrically controlled during the movement of the head along each track so as to achieve accurate scanning of the latter. In particular, a drive signal is applied to the deflecting means for controlling the latter to align the center of the magnetic head with the center of the track being scanned. The drive signal includes a tracking error signal corresponding to the deviation of the head from the center of the track being scanned and a wobbling or dithering signal which causes the magnetic head to be wobbled transversely with respect to the longitudinal direction of each record track. As a result of the latter wobbling signal, the RF signal reproduced by the head is subjected to amplitude modulation at the wobbling or dithering frequency in order to detect the amount and direction of tracking error and thereby obtain the tracking error signal.

Generally, in order to obtain the tracking error signal with a satisfactory signal-to-noise (S/N) ratio, the amplitude of the wobbling signal is selected so that the amplitude modulated component of the reproduced RF signal has an amplitude which is approximately 5-10% of the amplitude of the reproduced RF signal. However, when the head accurately follows the track to be scanned, the wobbling or dithering motion of the head is detected as the tracking error having a constant frequency component. In such case, it is desirable to reduce the amplitude of the wobbling or dithering signal to increase the tracking accuracy by the head. In other words a reduction in amplitude of the wobbling signal results in a corresponding decrease in the amplitude of the amplitude modulated component of the reproduced RF signal. It should be appreciated that this is contrary to the case where the magnetic head does not accurately scan the track. In the latter case, as previously mentioned, it is desirable to select the wobbling signal so that the amplitude modulated component of the reproduced RF signal has a relatively large amplitude of 5-10% of the amplitude of the reproduced RF signal.

In a copending case by the same inventor, U.S. patent application Ser. No. 06/232,014, filed Feb. 6, 1981, and having a common assignee herewith, it has been proposed to detect the actual deflection of the bi-morph leaf by means of a strain gauge mounted to the surface of the bi-morph leaf. A DC voltage corresponding to such actual deflection is produced and amplitude detected. The amplitude detected voltage is then compared with a reference voltage to produce an error voltage which is used to adjust the level of the wobbling signal from a controllable oscillator.

OBJECTS AND SUMMARY OF THE INVENTION

Accordingly, it is an object of this invention to provide an apparatus for reproducing information signals recorded in successive parallel tracks on a record medium with an improved tracking control system which avoids the above-described problems associated with the prior art.

More particularly, it is an object of this invention to provide a tracking control system, as aforesaid, which controls the amplitude of the wobbling motion of the magnetic head.

Another object of this invention is to provide a tracking control system, as aforesaid, in which the tracking accuracy by the magnetic head is increased, while also increasing the S/N ratio of the tracking error signal.

In accordance with an aspect of this invention, apparatus for reproducing information signals recorded in successive parallel tracks on a record medium includes transducer means movable in a direction along the tracks for reproducing the signals recorded therein; transducer deflecting means for controlling the position of the transducer means with respect to the tracks as the transducer means scans the latter; controllable oscillator means for supplying a wobbling signal to the transducer deflecting means so as to cause the latter to deflect the transducer means to oscillate in a transverse direction with respect to the tracks, whereby the signals reproduced by the transducer means are amplitude modulated at the frequency of the wobbling signal; tracking error detecting means for supplying a tracking error signal, corresponding to deviation of the transducer means from the respective track being scanned, to the transducer deflecting means so as to control the latter to correct the deviation; and signal detecting means for detecting at least a second harmonic component of the amplitude modulated signals reproduced by the transducer means and for controlling the amplitude of the wobbling signal from the oscillator means in response to the level of at least the second harmonic component.

The above, and other, objects, features and advantages of the invention, will be apparent in the following detailed description of illustrative embodiments thereof which is to be read in connection with the accompanying drawings.

BRIEF DESCRIPTION OF THE DRAWINGS

FIGS. 7A–7E are waveform diagrams used for explaining the operation of the head tracking control circuit of FIG. 4;

FIG. 9A is a waveform diagram of the amplitude modulated component of the reproduced RF signal, in which the amplitude thereof is turned down with respect to a predetermined level; and FIG. 9B is a graphical diagram illustrating the frequency spectrum of the amplitude modulated component of the reproduced RF signal shown in FIG. 9A.

DETAILED DESCRIPTION OF THE PREFERRED EMBODIMENTS

Figure 1:
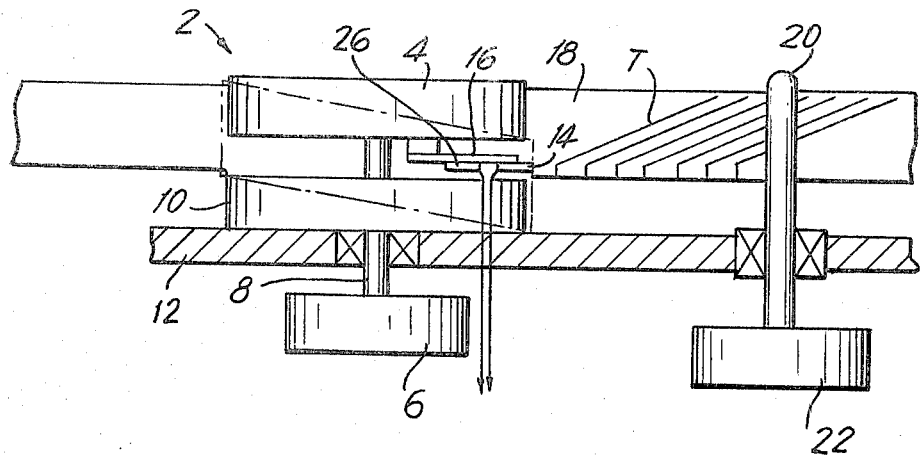
FIG. 1 is a schematic side elevational view of a head drum assembly of a known video tape recorder (VTR) of the helical-scan type with which a tracking control system according to this invention may be employed.

Referring to the drawings in detail, and initially to FIG. 1 thereof, there is shown a rotary head drum assembly 2 of a known one-head VTR of the helical-scan type. The rotary head drum assembly is shown to include an upper rotary drum 4 which is rotated by a drive motor 6 through a drive shaft 8, and a lower stationary drum 10 which is fixed on a chassis 12 of the VTR concentric with drive shaft 8 so as to be opposite upper drum 4 with a small gap therebetween. A magnetic head 14 is attached on the lower surface of upper drum 4 through a cantilevered bi-morph leaf 16, that is, an electro-mechanical transducer formed by laminating two piezo-ceramic leaves on opposite sides of an electrode sheet. Head 14 rotates with upper drum 4 at a predetermined rotational speed and is deflected perpendicularly to its scanning path, or transversely with respect to the longitudinal direction of each record track, by means of the bi-morph leaf 16.

A magnetic tape 18 is wrapped helically around the outer peripheries of upper drum 4 and lower drum 10 over an arc of almost 360°. During the recording operation, tape 18 is advanced longitudinally at a predetermined speed by a capstan 20 which, in turn, is driven by a capstan motor 22. In this manner, video or other information signals are recorded by head 14 in a series of parallel magnetic tracks T at a predetermined slant angle to the longitudinal direction of the tape 18, as shown in FIG. 1.

In the playback or reproducing operation with tape 18 being transported at the recording speed, an accurate video signal can be reproduced with a tracking servo system which includes a drum servo and/or capstan servo for adjusting the rotary phase of the head 14 so as to make the head correctly trace or scan the successive recorded tracks. In a playback mode employing an arbitrary tape speed which is different from the recording speed, both the phase and slant angle of the head scanning path do not coincide with the phase and slant angle, respectively, of the recorded track T. In such case, the vertical position of the head 14 must be changed by deflection of bi-morph leaf 16 in response to a control or drive signal so as to achieve initial phase error compensation and slant tracking error compensation. Accordingly, the phase error and slant error of the head scanning path relative to the tracks T can be corrected by deflection of bi-morph leaf 16 so that reproduced pictures in arbitrary or special reproducing modes, as well as in the normal reproducing modes, can be obtained without noise bars and noise bands.

Figure 2:
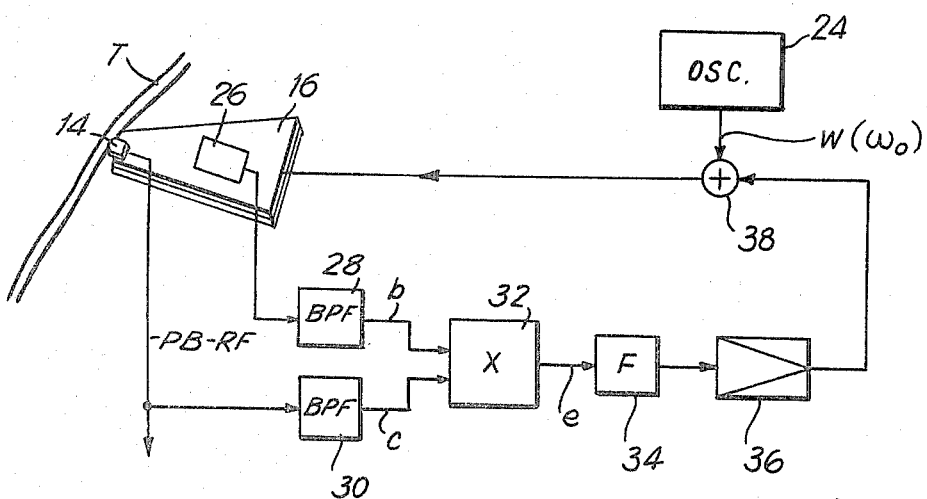
FIG. 2 is a block diagram of a head tracking control circuit according to the prior art, which can be used with the head drum assembly of FIG. 1.

Referring now to FIG. 2, there is shown a head tracking control circuit according to the prior art for controlling the deflection of the bi-morph leaf 16 which, in turn, controls the position of magnetic head 14 so that the latter accurately traces the tracks T. As shown therein, as oscillator 24 is provided which produces a wobbling or dithering signal w having a predetermined angular frequency $\omega_0$, for example, 1 KHz which is supplied to bi-morph leaf 16. As a result, the RF signal reproduced by head 14 is subjected to amplitude modulation at the wobbling or dithering frequency $\Omega_0$. The wobbling signal w is thereby used to detect the magnitude and direction of deviation of the head scanning path from the center of the track T then being scanned. For example, if magnetic head 14 deviates in its null position to the left of the center of track T in the transverse direction, the amplitude of the reproduced RF signal increases when the head is wobbled to the right in the direction transverse to the scanning direction of the head. Conversely, if the head deviates in the null position to the right of the center of track T in the transverse direction, the amplitude of the reproduced RF signal decreases when the head is wobbled to the right in the direction transverse to the scanning direction along the track. In this manner, a tracking error signal corresponding to the amount and direction of the tracking error or deviation of the actual scanning path relative to the recorded track can be obtained by synchronously detecting the amplitude modulated component included in the RF signal PB-RF by using the wobbling frequency of bi-morph leaf 16.

In addition to bi-morph leaf 16 being vibrated at the wobbling frequency, bi-morph leaf 16 is also caused to vibrate by undesirable mechanical vibrations, such as resonant (natural) and transient vibrations, the latter being created, for example, when a flyback voltage pulse is applied to bi-morph leaf 16 for producing a head jump in which the magnetic head 14 is caused to jump to another track. Such mechanical vibrations produce unwanted frequency components included in the reproduced RF signal which may be mixed with the tracking error signal during the synchronous detection operation and can adversely affect the tracking operation. Accordingly, a sensor, such as a strain gauge 26, is mounted to the surface of bi-morph leaf 16 so as to detect the deflection of bi-morph 16 and accordingly, of magnetic head 14. The output of strain gauge 26 is supplied through a band pass filter 28 for extracting certain vibration components so as to produce an output modulating signal b which has a band width corresponding to that of the amplitude modulated component of the reproduced RF signal. The output modulating signal b from band pass filter 28 is then supplied to one input of a multiplier circuit 32. At the same time, the reproduced RF signal from magnetic head 14 is supplied through a band pass filter or envelope detector 30 for extracting the amplitude modulated component (envelope signal) c of the reproduced RF signal which is caused by vibration of bi-morph leaf 16. The envelope signal c is then supplied to another input of multiplier circuit 32.

Accordingly, the modulating signal b from band pass filter 28 is multiplied by the envelope signal c in multiplier circuit 32 which functions as a synchronous detector. The level and polarity of the output of multiplier circuit 32 corresponds to the amount and direction of deviation of head 14 from the track then being scanned and is hereinafter referred to as the tracking error signal e. It should be appreciated that the output of strain gauge 26 includes the frequency component $\Omega_0$ of the wobbling signal and the mentioned undesired mechanical vibrations, both of which serve as the modulating wave for the amplitude modulation and do not include any information with regard to the tracking error. Therefore, correlation between the modulating wave b (the output of the strain gauge 26 and band pass filter 28) and the modulated wave c (the output of the detecting circuit 30) is considered in multiplier circuit 32 which functions as a synchronous detector. The in-phase components ($\Omega_0$-component and the undesired mechanical vibration component) included in both inputs to multiplier circuit 32 are eliminated therethrough and only the tracking error signal e is detected therefrom. In this manner, there is no need to provide a narrow band filter for eliminating unwanted vibratory components from the error signal at the output of multiplier circuit 32. Thus, the tracking servo loop can be used with a relatively wide frequency band, thereby providing a fast tracking response without delay.

The error signal e from multiplier circuit 32 is supplied through a filter circuit 34 to an amplifier 36. Filter circuit 34 functions as a trap filter for eliminating components having a frequency $2\Omega_0$ which are generated in multiplier circuit 32. The amplified error signal from amplifier 36 is supplied to an adder 38 where it is added to wobbling signal w from oscillator 24. The output from adder 38 is then supplied to bi-morph leaf 16 as the drive or control voltage therefor.

Figure 3A:
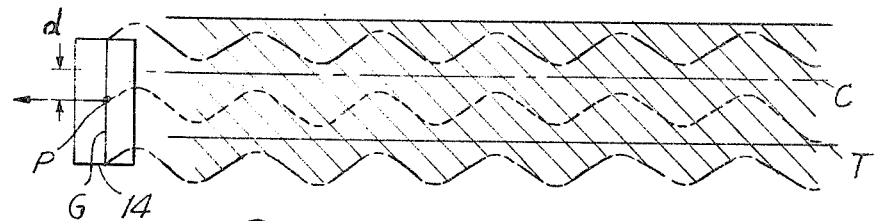
FIGS. 3A–3F are schematic illustrations showing different tracings of the magnetic head on a track and the corresponding waveforms of the outputs from the magnetic head in response to such tracings.
Figure 3B:
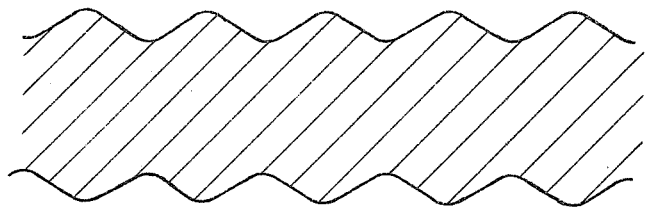
Figure 3C:
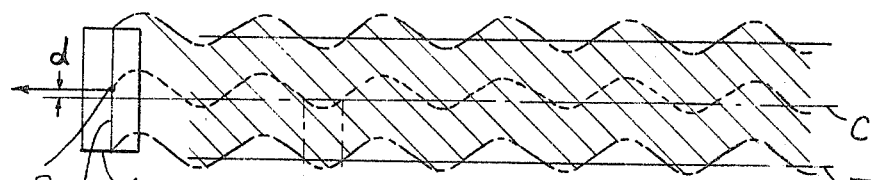
Figure 3D:
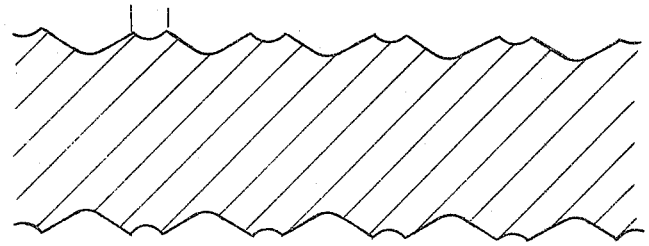
Figure 3E:
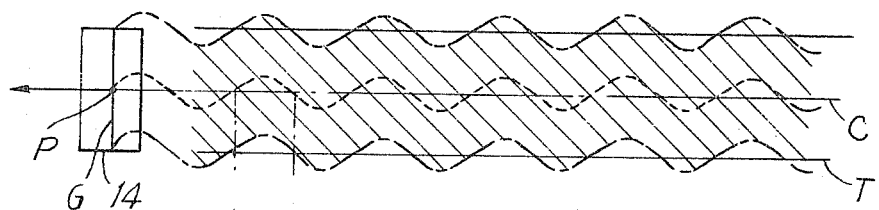
Figure 3F:
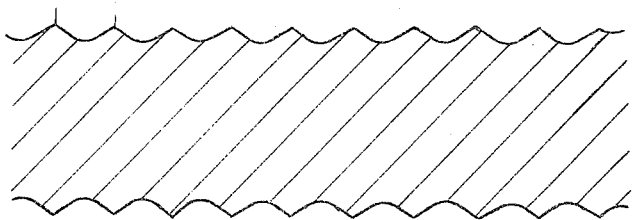

Although any suitable waveform, such as a rectangular or triangular wave, may be used for the wobbling signal w, the operation of the circuit of FIG. 2 will now be described for a wobbling signal w having a sinusoidal waveform sin $\omega_0 t$. In particular, and referring to FIGS. 3A–3F, different sinusoidal scanning paths of head 14 on a track T are shown in FIGS. 3A, 3C and 3E, and the envelope waveforms of the reproduced RF signal from head 14 due to such scanning operations are shown in FIGS. 3B, 3D and 3F, respectively. It should be appreciated that the amplitude of the reproduced RF signal is at a maximum when the center P of the air gap G of head 14 coincides with the center line C of track T. Conversely, the amplitude of the reproduced RF signal decreases when the center P of head 14 deviates from center line C.

FIG. 3A illustrates the case where the head center P deviates from the track center line C by a large amount d. In this case, the deviation d is greater than the amplitude of the sinusoidal waveform from its zero position, and therefore, the head center P never crosses the track center line C and the amplitude of the reproduced RF signal never achieves its maximum possible value. The envelope of the reproduced RF signal in such case is subjected to amplitude modulation by the wobbling signal w of the sinusoidal waveform sin $\omega_0 t$, as shown in FIG. 3B. In this manner, the amplitude modulated component of the reproduced RF signal is in phase with the wobbling signal w when the head center P deviates in its null or rest position to the left (downward direction in the drawing) of the track center line C, as shown in FIG. 3B. At such time, the tracking error signal e from multiplier circuit 32 has a large positive amplitude. Conversely, if the head center P were to deviate in its null position to the right (upward direction in the drawing) of the track center line C, the amplitude modulated component of the reproduced RF signal would have a phase opposite to that of the wobbling signal, whereby the tracking error signal e from multiplier circuit 32 would have a large negative amplitude.

When the head center P deviates in its null position from the track center line C by a small amount, as shown in FIG. 3C, the level of the reproduced RF signal is at a maximum when the head center P crosses the track center line C. The envelope of the reproduced RF signal in such case is shown in FIG. 3D to be turned down with respect to the track center line C. Further, in this case, the amplitude modulated component of the reproduced RF signal includes as a dominant portion thereof the fundamental harmonic component ($\omega_0$) and the second harmonic component ($2\omega_0$) in a certain ratio.

In the case where the head center P in its null position corresponds with or is aligned with the track center line C, as shown in FIG. 3E, the head center P crosses the track center line C every half period of the wobbling signal w. Accordingly, the amplitude of the reproduced RF signal is at a maximum every half period of the wobbling signal w, as shown in FIG. 3F. Further, the envelope of the reproduced RF signal is shown in FIG. 3F to be turned down with respect to the track center line C for every half cycle of the sinusoidal waveform sin $\omega_0 t$. The amplitude modulated component or envelope signal c in such case can be expressed as follows:

$$c = |\sin \omega_0 t| = \frac{2}{\pi} - \frac{4}{\pi} \sum_{n=1}^{\infty} \frac{\cos 2n\omega_0 t}{4n^2 - 1} \qquad (1)$$

It should be appreciated that the amplitude modulated component of the reproduced RF signal does not include the fundamental harmonic component ($107_0$) in this tracking mode, but rather, includes even harmonic components with the second harmonic component ($2\omega_0$) comprising approximately 42% of the signal as the dominant component thereof. Thus, multiplier circuit 32 performs the operation: wobbling component ($\omega_0$) × even harmonic components ($2n\omega_0$) = odd harmonic component. Accordingly, integration over one period of the fundamental harmonic component after such multiplication operation always results in the tracking error signal e being equal to zero, corresponding to no tracking error.

Among the three tracking modes shown in FIGS. 3A, 3C and 3E, the tracking mode of FIG. 3A has the greatest tracking deviation and therefore represents the worst case, while FIG. 3E illustrates the case of no tracking error and has, prior to this invention, represented the best case. It should be appreciated that the head tracking control circuit of FIG. 2 is designed to attain the tracking mode of FIG. 3E.

However, as will hereinafter be discussed, the tracking mode of FIG. 3E is not the best tracking mode. As previously discussed, the tracking error signal e is attained by synchronously detecting the amplitude variation of that part of the reproduced RF signal which corresponds to the wobbling of magnetic head 14. However, since the amplitude variation of the reproduced RF signal includes various undesirable components caused by, for example, curving of the track T, variation of the track width, noise and the like, which do not correspond to the wobbling of the head, the amplitude of the wobbling signal w has been selected sufficiently large to overcome these latter components. For example, the amplitude of the wobbling signal w has been selected so that the amplitude of the amplitude modulated component of the reproduced RF signal is approximately 5-10% of the amplitude of the reproduced RF signal.

However, in the "perfect" tracking mode of FIG. 3E, the dominant portion of the tracking error signal e is comprised of the amplitude modulated component which corresponds to the wobbling signal w. In other words, in such "perfect" tracking mode, the fluctuation of magnetic head 14 by the wobbling motion is considered as the tracking error. In such case, it is desirable to reduce the amplitude of the wobbling motion so as to decrease the amplitude of the amplitude modulated component of the reproduced RF signal. Even if the S/N ratio of the tracking error signal e decreases, for example, due to an increase in the aforementioned undesirable components which would result in an increase in the residual tracking error, the resultant tracking accuracy would still be improved. This is because, as previously discussed, the wobbling motion of magnetic head 14 which constitutes the dominant portion of the amplitude modulated component would be substantially decreased. Metaphorically speaking, the amplitude of wobbling of a car driven on a smooth-surfaced expressway with clear roadside lines is necessarily less than that of a car driven on a rough country road with unclear roadside lines. Therefore, in accordance with an aspect of this invention, the amplitude of the wobbling motion of head 14 is varied in accordance with the magnitude of the tracking deviation d. In other words, for the tracking mode of FIG. 3E, where the tracking deviation d is equal to zero, the amplitude of wobbling signal w is selected to be relatively small. On the other hand, in the tracking mode of FIG. 3A, where a large tracking deviation d exists, the amplitude of wobbling signal w is selected to be relatively large.

Although it is possible to control the amplitude a of the wobbling signal w from oscillator 24 by using the detected tracking error signal e from multiplier circuit 32, this solution has a distinct disadvantage. In particular, when the tracking error signal e decreases due to a reduction of the tracking deviation d, the amplitude a of wobbling signal w would also decrease. With the reduction of the amplitude a, the level of the fundamental harmonic component ($\omega_0$) in both the output signal b from band pass filter 28 and the amplitude modulated component c from band pass filter 30 would also decrease, resulting in a further reduction in the level of the tracking error signal e from multiplier circuit 32. Such further reduction in the level of the tracking error signal e would result in a further decrease in the amplitude a. This process would continue whereby the amplitude a of wobbling signal w would continuously converge. Conversely, if the tracking error signal e is increased due to an increase in the tracking deviation d, this would result in an increase in the amplitude a of wobbling signal w. This would, in turn, result in a further increase in the level of the tracking error signal e which, in turn, would increase the amplitude a. This procedure would continue whereby the amplitude a of wobbling signal w would continuously diverge. It should therefore be appreciated that the amplitude a of wobbling signal w would either converge or diverge irrespective of the tracking deviation d. In other words, the arrangement for controlling the amplitude a by the tracking error signal e creates a positive feedback loop with the fundamental harmonic component ($\omega_0$) constituting a major control factor therein. In particular, if the amplitude a of wobbling signal w, corresponding to the magnitude of the fundamental harmonic component ($\omega_0$), is varied using the tracking error signal e, the level of the tracking error signal e is, in turn, varied by the amplitude a of the wobbling signal w. This results in a lack of correspondence between the tracking error signal e and the tracking deviation d, rendering the tracking servo system unstable, and effectively rendering the position control for magnetic head 14 inoperative.

Accordingly, the present invention utilizes the relationship between the fundamental harmonic component ($\omega_0$) in the amplitude modulated component c of the reproduced RF signal and the second harmonic component ($2\omega_0$) therein. In particular, an increase in the level of the fundamental harmonic component ($\omega_0$) in the amplitude modulated component c of the reproduced RF signal results in a decrease in the level of the second harmonic component ($2\omega_0$) therein. The present invention utilizes this relationship for maintaining correspondence between the level of the detected tracking error signal e and the tracking deviation d. In particular, this is accomplished by controlling the amplitude a of wobbling signal w on the basis that the levels of the fundamental harmonic component ($\omega_0$) and the second harmonic component ($2\omega_0$) are always included in the amplitude modulated component of the reproduced RF signal in an appropriate ratio to prevent the amplitude a from either continuously diverging or converging as in the aforementioned control system. The ratio obtained from the tracking mode of FIG. 3C is an appropriate ratio that can be utilized with the present invention.

Figure 4:
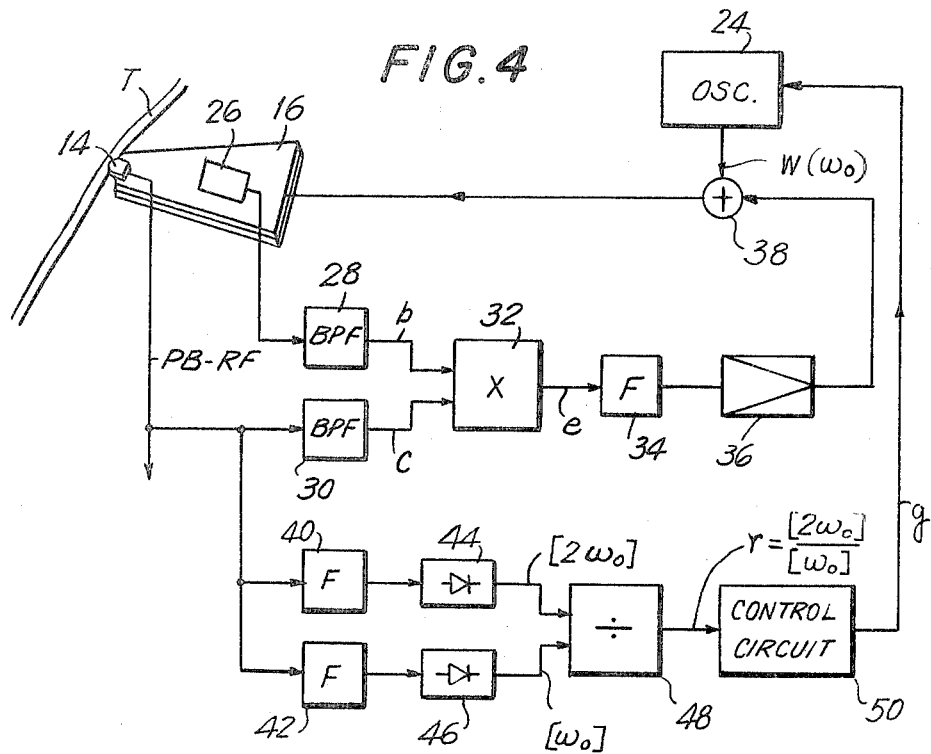
FIG. 4 is a block diagram of a head tracking control circuit according to one embodiment of this invention.

Referring now to FIG. 4, one embodiment of a head tracking control circuit according to this invention which utilizes the above principle will now be described, with elements corresponding to those described above with reference to the prior art head tracking control circuit of FIG. 2 being identified by the same reference numerals. As shown therein, a control loop for controlling the amplitude a of wobbling signal w from oscillator 24 has been added to the previously described head tracking control circuit of FIG. 2. In particular, the reproduced RF signal PB-RF from magnetic head 14 is supplied to band pass filters 40 and 42 which function to extract components of the amplitude modulated component of the reproduced RF signal near the second harmonic frequency ($2\omega_0$) and the fundamental harmonic frequency ($\omega_0$), respectively. The outputs from band pass filters 40 and 42 are supplied to amplitude detector circuits 44 and 46, respectively, which produce signals [$2\omega_0$] and [$\omega_0$] corresponding to the amplitudes of the second harmonic ($2\omega_0$) and fundamental harmonic ($\omega_0$) components, respectively. The amplitude signals [$2\omega_0$] and [$\omega_0$] are supplied to respective inputs of a divider circuit 48 which performs a division operation [$2\omega_0$]/[$\omega_0$] to produce a ratio output signal r. This latter signal is supplied to an oscillator control circuit 50 which produces a control signal g in response to ratio output signal r and which is supplied to oscillator 24 for controlling the amplitude a of wobbling signal w therefrom. The remainder of the circuit of FIG. 4 is identical to that of FIG. 2 and will not be repeated herein.

Figure 5:
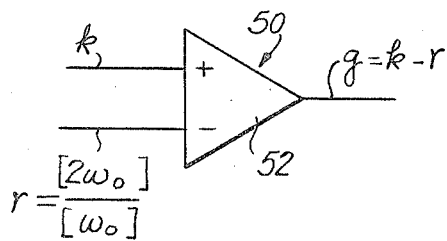
FIG. 5 is a circuit-wiring diagram of one embodiment of an oscillator control circuit that can be used in the circuit of FIG. 4.
Figure 6:
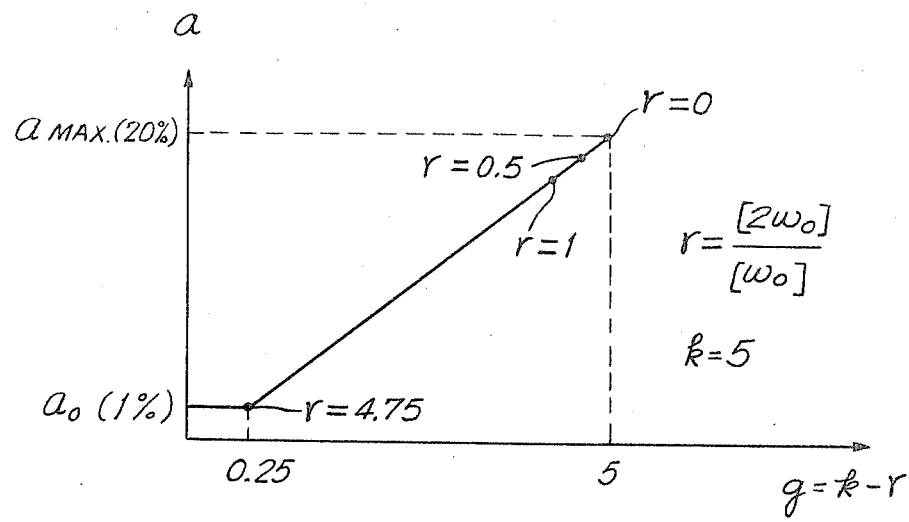
FIG. 6 is a graphical diagram illustrating the relationship between the level of the control signal supplied to the oscillator and the amplitude of the wobbling signal from the oscillator.

One embodiment of a control circuit 50 that can be utilized with the head tracking control circuit of FIG. 4 is shown in FIG. 5 to include a comparator circuit 52 comprised of an operational amplifier. Comparator circuit 52 is supplied with a reference voltage k at its non-inverting input and with the ratio output signal r at its inverting input, and performs a subtraction operation k−r to produce the oscillator control signal g. It should be appreciated that the ratio output signal r varies in the range from infinity in the tracking mode of FIG. 3E where the second harmonic component ($2\omega_0$) is the dominant component to zero in the tracking mode of FIG. 3A where the fundamental component ($\omega_0$) is the dominant component. Thus, for example, if the reference voltage k is assigned a value of 5, the level of the control signal g will vary in the range from negative infinity to 5. Of course, it should be appreciated that a limiting value for the level of ratio output signal r will be utilized rather than the infinity value. For example, there is shown in FIG. 6 a graphical representation of the amplitude a of wobbling signal w (and consequently, of the wobbling motion of head 14) versus the level of control signal g. In such case, the ratio output signal r is limited at its upper level by the aforementioned value of zero (g×5), which results in a maximum amplitude $a_{max}$ equal to 20% of the level of the reproduced RF signal. The lower limit $a_0$ of the amplitude variation is selected to be 1% of the level of the reproduced RF signal when the level of control signal g is less than or equal to 0.25, that is g≦0.25 (r=4.75), in which r is limited in value to 4.75 for g≦0.25.

The operation of the head tracking control circuit of FIG. 4 will now be described with reference to the waveform diagrams of FIGS. 7A–7E, which illustrate the tracking paths of the head 14 as the latter is wobbled transversely with respect to a track by the control circuit of FIG. 4, and consequently, illustrate the envelope of the reproduced RF signal. When the deviation d of the head center P (dashed line) from the track center line C (dot-dash line) is large, as shown in FIG. 7A, corresponding to the tracking mode of FIG. 3A, the envelope or amplitude modulated component of the reproduced RF signal is comprised substantially only of the fundamental harmonic component ($\omega_0$). Accordingly, the ratio output signal r is essentially equal to zero in such case so as to increase the amplitude of the wobbling motion of head 14 to as much as 20% of the track width, in accordance with the graphical representation of FIG. 6. At the same time, multiplier circuit 32 detects the tracking error to control the center point P of magnetic head 14 by means of bi-morph leaf 16, whereby to reduce the deviation d of the head. The above results are shown in the waveform of FIG. 7B which is derived from the wobbling signal w, but which is turned down with respect to the center line C at the positions where the center point P of magnetic head 14 crosses center line C. Accordingly, the second harmonic component ($2\omega_0$) increases and the fundamental harmonic component ($\omega_0$) decreases, whereby to increase the ratio output signal r and reduce the level of the control signal g. This, of course, results in the amplitude of the wobbling motion decreasing, in accordance with the graphical representation of FIG. 6, as shown more specifically in FIG. 7C. At the same time, the servo loop of the head tracking control circuit functions to reduce the track deviation d in response to the reduced tracking error signal e from multiplier circuit 32.

In like manner, the amplitude a of the wobbling signal decreases as the track deviation d decreases, as shown in FIGS. 7D and 7E, until the system becomes stable with the amplitude of the wobbling motion of head 14 being less than or equal to 1% of the track width, and the ratio output signal r being equal to approximately 4.75, as shown in FIG. 7E. It should be appreciated that the minimum amplitude $a_0$ of vibration of head 14 may be set to the minimum possible amplitude at which the head tracking control circuit of FIG. 4 can operate plus a noise margin. For example, the minimum amplitude $a_0$ of the wobbling motion is preferably about 1% of the track width, that is, the minimum amplitude $a_0$ of the wobbling signal is about 1% of the amplitude of the reproduced RF signal, when the tracking deviation or error d is equal to zero. It should be appreciated that this minimum amplitude $a_0$ is much smaller than that in conventional head tracking control systems whereby the tracking accuracy in the best tracking mode is improved.

It should be appreciated, as shown in FIG. 7E, that with the minimum amplitude $a_0$ of the wobbling signal w being set, and the value of the ratio output signal r, being equal to 4.75 (FIG. 6), there exists a small offset deviation $d_0$ which is uniquely determined for the aforementioned values. Within the range of $\pm d_0$ on both sides of the track center line C, the level of the ratio output signal r is greater than 4.75 and the amplitude a of the wobbling signal w is fixed to its minimum value $a_0 = 1\%$. Thus, the circuit of FIG. 4 is locked in a steady state condition whereby the error detection portion, that is, the error detection loop shown in FIG. 2 and redrawn in FIG. 4, alone will operate. In this condition, the head is controlled so that the center P thereof approaches the track center line C. However, the error detection portion of the circuit is always subjected to disturbances which create noise in the tracking error signal e. When the magnitude of the true error signal e, that is, without the disturbances, is comparable to that of the noise components, that is, S/N=1, the head cannot pinpoint the track center line C, causing the head to fluctuate thereabout with a small deviation d'. Accordingly, the offset deviation $d_0$ is set at a value substantially equal to that of the deviation d' caused by such noise whereby the ratio output signal r becomes set at a predetermined value at the minimum amplitude $a_0$, as shown in FIG. 7E. In such case, the head tracking control circuit of FIG. 4 is stable with such offset deviation $d_0$ being maintained. It should be appreciated, however, that the minimum offset deviation $d_0$ may be set to a value larger than the deviation $d'$.

In this state, the amplitude modulated component of the reproduced RF signal always includes the fundamental harmonic component ($\omega_0$). Thus, magnetic head 14 scans the track more accurately and with a higher response than that achieved in the conventional best tracking mode shown in FIG. 3E in which the second harmonic component ($2\omega_0$) alone is included in the reproduced RF signal and the detected tracking error signal e is equal to zero. In other words, with the present system, the magnetic head 14 scans the proximate area of the track center line C with a predetermined small magnitude of the tracking error signal e being continuously detected and the head tracking control circuit operating in a stable condition. If the level of the tracking error signal e increases, it will be immediately detected by the error detection portion of the circuit so as to immediately modify the tracking operation.

Further, when the deviation d is large, as shown in FIG. 7B, the amplitude of the wobbling motion is increased, for example, to a level 2-3 times of that in the prior art head tracking control circuit of FIG. 2, and consequently, a high level tracking error signal e is obtained from multiplier circuit 32 in FIG. 4. It should be appreciated that for such large tracking deviation d, the high level tracking error signal e can be obtained with a relatively small loop gain, in which the loop gain is principally determined by the gain of amplifier 36. In this manner, the noise level of the error detection portion of the circuit of FIG. 4 is reduced and the S/N ratio of the tracking error signal e is thereby improved.

Although certain values have been used for illustration in FIG. 6, it should be appreciated that other suitable values may be used in place thereof. For example, the level of the reference voltage k can arbitrarily be set to 2.5 and the level of the ratio output signal r can arbitrarily be set in the range of $0.5 < r < 2.4$, in order to obtain a value for the control signal g varying in the range of $0.1 < g < 2.0$, with $g = k - r$. Also, the minimum and maximum amplitudes $a_0$ and $a_{max}$ can arbitrarily be set, for example, in the range of 3-30% of the track width. In addition, although the range of the amplitude a of the wobbling signal w has been shown in FIG. 6 to vary in a linear manner, it should be understood that it may vary in other ways, for example, as an exponential, logarithmic or quadratic function of the control signal g.

Figure 8:
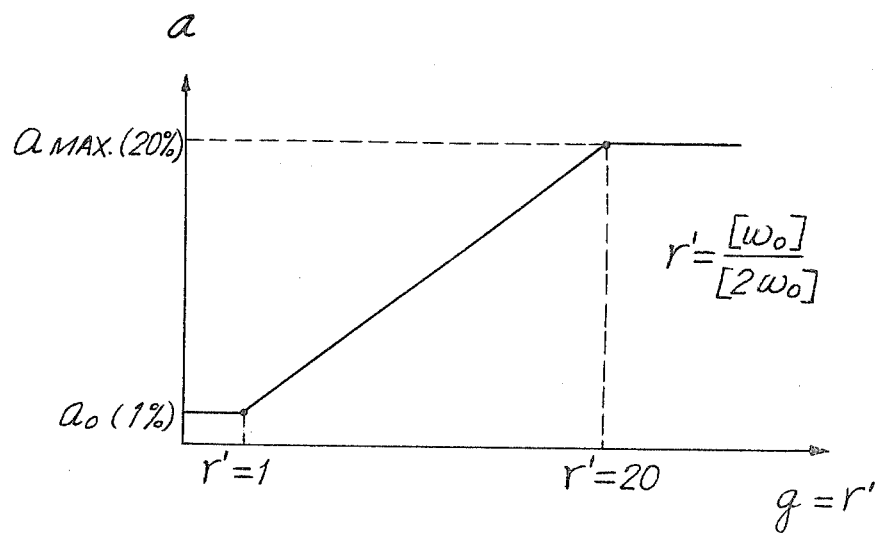
FIG. 8 is another graphical diagram illustrating the relationship between the control signal supplied to the oscillator and the amplitude of the wobbling signal from the oscillator.

Further, it should be appreciated that although divider circuit 48 has previously been discussed as performing a division operation $[2\omega_0]/[\omega_0]$, divider circuit 48 can be arranged to perform an inverse division operation $[\omega_0]/[2\omega_0]$ to produce an inverted ratio output signal r' which varies from a zero value in the tracking mode of FIG. 3E to a value of infinity in the tracking mode of FIG. 3A. In this case, the oscillator control circuit 50 can be constituted merely by an amplifier which supplies an amplified inverted ratio output signal r' to the amplitude control input of oscillator 24 as the control signal g. The amplifier in control circuit 50 may also be provided with limiting circuits to limit the range of the amplitude a within respective upper and lower limits, as shown in FIG. 8. For example, the upper and lower limits may be set so that the amplitude a varies within the range of 1-20% of that of the reproduced RF signal, as the level of the inverted ratio output signal r' varies in the range of 1-20. As another example, the amplitude a may vary within the range of 5-20% when the level of the inverted ratio output signal r' varies within the range of 0.5-2.

Accordingly, with the above arrangement, a large fundamental harmonic component ($\omega_0$) is obtained for a large tracking error and the error detecting operation is achieved with a relatively large amplitude of the wobbling motion of magnetic head 14. Conversely, as the tracking error decreases, the second harmonic component ($2\omega_0$) increases, resulting in a decrease in the inverted ratio output signal r' and a consequent reduction in the wobbling amplitude. As in the first-mentioned arrangement, the stable operating point of the system preferably occurs at the minimum amplitude $a_0 = 1\%$ and, the inverted ratio output signal r' at such time is determined by the gain of the control circuit or amplifier 50. In this manner, a suitable value for the inverted ratio output signal r' can be determined by adjusting the gain of the control circuit 50. For example, the amplitude of the wobbling motion may be set in the range of 1-20% of the track width for values of the inverted ratio output signal r' in the range of 0.5-2 (or values for the ratio output signal r in the range of 2-0.5). In such case, the minimum amplitude $a_0$ will occur at a value for the inverted ratio output signal $r' = 0.5$ ($r = 2$). Further, the control circuit 50 may be arranged so that the control signal g varies as an exponential or logarithmic function of the inverted ratio output signal r'.

As an alternative embodiment, the divider circuit 48 of FIG. 4 may be eliminated, and the amplitude of the wobbling signal w from oscillator 24 controlled only by the level of the second harmonic component ($2\omega_0$) obtained from the output of detector circuit 44. In such case, control circuit 50 may include a comparator circuit, as shown in FIG. 5, or a reciprocating circuit, to form a negative feedback loop whereby the amplitude a of the wobbling signal w decreases as the second harmonic component ($2\omega_0$) increases. The operation of this latter described circuit arrangement is identical to that of the circuit shown in FIG. 4 but is based on the principle that the ratio of the fundamental harmonic component ($\omega_0$) to the second harmonic component ($2\omega_0$) is constant. In other words, the amplitude a of the wobbling signal w is controlled for tracking purposes while the ratio r is kept at a constant value.

As previously discussed in regard to FIGS. 7A-E, the envelope or amplitude modulated component of the reproduced RF signal has a waveform which is derived from the wobbling signal w but is turned down with respect to the track center line C. Assuming that the wobbling signal w is a sinusoidal function expressed as $w = \sin \omega_0 t$ (dashed line in FIG. 9A) and the cut-off or turning down line (dot-dash line in FIG. 9A) is set to a value $w = m$, as shown in FIG. 9A, the spectrum of the various harmonic components included in the amplitude modulated component (solid line in FIG. 9A), is shown in FIG. 9B. If the value of $m = 1$, corresponding to the tracking mode of FIG. 3A, the fundamental harmonic component ($\omega_0$) is at a maximum and the second harmonic component ($2\omega_0$) is equal to zero, as shown in FIG. 9B. At a value of $m = 0$, corresponding to the tracking mode of FIG. 3E, the second harmonic component ($2\omega_0$) is at a maximum and the fundamental harmonic component ($\omega_0$) is equal to zero. Further, from a review of FIG. 9B, it can be seen that the rate of change of the ratio r of the second harmonic component to the fundamental harmonic component, that is, $r = [2\omega_0]/[\omega_0]$, is at a maximum at a value of $r = 1$. Accordingly, in order to enhance the sensitivity of divider circuit 48 in FIG. 4, it is desirable to set the maximum range of variation of the ratio output signal r (FIG. 6) between 0.1 and 5. However, the amplitude a is preferably set to vary in the range of approximately 1–20% for the level of the ratio output signal r in the range of 0.5 to 2.

Thus, in accordance with the present invention, the amplitude of the wobbling motion of the bi-morph leaf which controls the position of the magnetic head, is controlled in accordance with at least the magnitude of the second harmonic component ($2\omega_0$) included in the amplitude modulated component of the RF signal reproduced by the magnetic head. With such an arrangement, for a small tracking error, the amplitude of the wobbling motion can be made small to increase the actual tracking accuracy. Further, since tracking error information can be detected while the fundamental harmonic component ($\omega_0$) in the amplitude modulated component of the reproduced RF signal is steadily increased, error information with a satisfactory S/N ratio can be obtained to increase the tracking response.

Although various embodiments have been described above, it should be appreciated that other modifications within the scope of this invention, as claimed herein, may be made by one of ordinary skill in the art. For example, in the embodiment of FIG. 4, correlation between the outputs of strain gauge 26 and the amplitude modulated component of the reproduced RF signal is accomplished by means of multiplier circuit 32. However, the system may be arranged so that a tracking error signal is produced by performing a synchronous detection operation on the amplitude modulated component of the reproduced RF signal by using the wobbling signal w from oscillator 24. Further, the strain gauge 26 provided on bi-morph leaf 16 may be replaced with a sensor of a varying capacitance type or with a piezo-electric transducer made from the same type of material as bi-morph leaf 16.

Having described specific preferred embodiments, of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for reproducing information signals recorded in successive parallel tracks on a record medium, comprising:
    transducer means movable in a direction along the tracks for reproducing the signals recorded therein;
    transducer deflecting means for controlling the position of said transducer means with respect to said tracks as the transducer means scans the latter;
    controllable oscillator means for supplying a wobbling signal to said transducer deflecting means so as to cause the transducer deflecting means to effect oscillatory deflection of said transducer means in a transverse direction with respect to said tracks, said signals reproduced by said transducer means being amplitude modulated at the frequency of said wobbling signal;
    tracking error detecting means for supplying to said transducer deflecting means a tracking error signal corresponding to deviation of said transducer means from any one of said tracks being scanned so as to control the transducer deflecting means for correcting said deviation;
    signal detecting means for detecting at least a second harmonic component of the amplitude modulated signals reproduced by said transducer means; and
    means for controlling the amplitude of the wobbling signal from said controllable oscillator means in accordance with the ratio of the level of at least said second harmonic component relative to a reference level.

2. Apparatus according to claim 1; in which said signal detecting means further detects a fundamental harmonic component of the amplitude modulated signals reproduced by said transducer means, and the level of said fundamental harmonic component is said reference level.

3. Apparatus according to claim 2; in which said signal detecting means includes first filter means for detecting said fundamental harmonic component, first amplitude detecting means for producing a first amplitude signal corresponding to the level of said fundamental harmonic component, second filter means for detecting said second harmonic component, and second amplitude detecting means for producing a second amplitude signal corresponding to the level of said second harmonic component.

4. Apparatus according to claim 3; in which said signal detecting means further includes divider means for dividing the second amplitude signal by the first amplitude signal to produce a ratio output signal in response thereto, and oscillator control means for controlling the amplitude of the wobbling signal from said controllable oscillator means in response to said ratio output signal so as to reduce the amplitude of said wobbling signal.

5. Apparatus according to claim 4; in which said oscillator control means includes comparator means for comparing said ratio output signal with a reference signal and for producing an oscillator control signal for controlling the amplitude of the wobbling signal in response to said comparison operation.

6. Apparatus according to claim 5; in which said comparator means includes an operational amplifier having an inverting input supplied with said ratio output signal and a non-inverting input supplied with said reference signal, said operational amplifier producing said oscillator control signal in response to the subtraction of said ratio output signal from said reference signal.

7. Apparatus according to claim 4; in which the amplitude of said wobbling signal is maintained within a predetermined range of values in accordance with a corresponding predetermined range of values for the ratio output signal.

8. Apparatus according to claim 3; in which said signal detecting means further includes divider means for dividing the first amplitude signal by the second amplitude signal to produce a ratio output signal in response thereto, and oscillator control means for controlling the amplitude of the wobbling signal from said controllable oscillator means in response to said ratio output signal so as to reduce the amplitude of said wobbling signal.

9. Apparatus according to claim 8; in which said oscillator control means includes amplifier means for amplifying said ratio output signal and for controlling the amplitude of the wobbling signal in response to said amplified ratio output signal.

10. Apparatus according to claim 9; in which said oscillator control means further includes limiter means for limiting the level of said ratio output signal within a predetermined range of values defined between respective upper and lower limits, wherein the amplitude of said wobbling signal is controlled to vary within a predetermined range of values corresponding to said predetermined range of values of said ratio output signal.

11. Apparatus according to claim 1; in which said signal detecting means includes filter means for detecting said second harmonic component, amplitude detecting means for producing an output signal corresponding to the level of said second harmonic component, and oscillator control means for controlling the amplitude of the wobbling signal from said controllable oscillator means in response to the output signal from said amplitude detecting means so as to reduce the amplitude of the wobbling signal as the level of said second harmonic component increases.

12. Apparatus according to claim 1; in which said record medium is a magnetic tape having said tracks extending obliquely thereon, said tape extends helically about at least a portion of the periphery of a guide drum and is adapted to be longitudinally advanced, at least a portion of said guide drum is rotatable, and said transducer means includes a magnetic head mounted by means of said transducer deflecting means on said rotatable portion of the guide drum so as to rotate with the latter and thereby scan along a selected one of the tracks positioned in proximity thereby by advancement of the tape.

13. Apparatus according to claim 12; in which said transducer deflecting means is constituted by a bi-morph leaf which is cantilevered at one end and has said magnetic head secured to the other end thereof, and said tracking error signal and wobbling signal are applied to said bi-morph leaf for flexing the same and thereby causing deflection of said bi-morph leaf in the transverse direction of said tracks.

14. Apparatus according to claim 13; in which said tracking error detecting means includes vibration sensing means secured on said bi-morph leaf so as to be stressed in accordance with the flexing of said leaf.

15. Apparatus according to claim 1; further including adder means for adding said wobbling signal to said tracking error signal to produce a drive signal and for supplying said drive signal to said transducer deflecting means so as to control the latter to accurately position said transducer means with respect to said tracks.

16. Apparatus according to claim 1; in which said tracking error detecting means includes vibration sensing means for generating a deflection signal in correspondence to the deflection of said transducer means in said transverse direction from a null position, envelope detecting means for detecting the envelope of the amplitude modulated signals reproduced by said transducer means as the latter moves along a track and oscillates in said transverse direction, and means for synchronously detecting the detected envelope from said envelope detecting means by means of said deflection signal so as to obtain said tracking error signal which is representative of the deviation of said null position of said transducer means from the center of the track being scanned, considered in the transverse direction.

17. Apparatus according to claim 16; in which said means for synchronously detecting includes multiplier means having one input receiving said detected envelope from the envelope detecting means and another input receiving said deflection signal.

* * * * *